US008898517B2

(12) United States Patent
Cheng et al.

(10) Patent No.: US 8,898,517 B2
(45) Date of Patent: *Nov. 25, 2014

(54) HANDLING A FAILED PROCESSOR OF A MULTIPROCESSOR INFORMATION HANDLING SYSTEM

(75) Inventors: Yao-Chun Cheng, Taipei (TW); Yuan-Ning Lien, New Taipei (TW); Chuan Yung Liu, Taipei (TW); Feng-I Liu, Keelung (TW); Kuei Huang Liu, Changhua (TW); Michael J. Peters, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/309,598

(22) Filed: Dec. 2, 2011

(65) Prior Publication Data
US 2012/0173922 A1  Jul. 5, 2012

(30) Foreign Application Priority Data

Dec. 30, 2010 (TW) .............................. 99146950 A

(51) Int. Cl.
*G06F 11/00* (2006.01)
*G06F 11/14* (2006.01)
*G06F 11/20* (2006.01)

(52) U.S. Cl.
CPC ........ *G06F 11/1417* (2013.01); *G06F 11/1428* (2013.01); *G06F 11/2025* (2013.01); *G06F 11/2038* (2013.01); *G06F 11/2043* (2013.01)
USPC .............................................. 714/13; 713/2

(58) Field of Classification Search
USPC ........................................................ 714/13
See application file for complete search history.

(56) References Cited

U.S. PATENT DOCUMENTS 5,790,850 A * 8/1998 Natu .................................. 713/2
5,860,002 A * 1/1999 Huang .............................. 713/2

(Continued)

FOREIGN PATENT DOCUMENTS

CN 101071356 A 11/2007
CN 101110008 A 1/2008

(Continued)

OTHER PUBLICATIONS

Guangdong Weichuang Rixin Elec, "Infrared touch screen and its multi-point touch positioning method", CN101071356(A) English Abstract—Nov. 14, 2007, Espacenet—Bibliographic data, 1 page.

(Continued)

*Primary Examiner* — Kamini Patel
(74) *Attorney, Agent, or Firm* — Katherine S. Brown; Jeffrey L. Streets

(57) ABSTRACT

An apparatus for handling a failed processor of a multiprocessor system including at least two processors interconnected by processor interconnects for facilitating transactions of the processors. The at least two processors include a first processor set as a default boot processor in response to a boot up operation of the multiprocessor computer, and a second processor. The apparatus includes: a baseboard management module for detecting and receiving health information of the processors; a multiplexer coupled to the baseboard management module and respectively to the processors, the multiplexer being operative to switch between the processors; and a processor ID controller coupled to the baseboard management module and respectively to the processors. In response to the health information indicating the first processor has failed, the processor ID controller sets the second processor as the default boot processor and the baseboard management module enables the multiplexer to switch to the second processor.

11 Claims, 3 Drawing Sheets

(56) References Cited

U.S. PATENT DOCUMENTS

| | | | |
|---|---|---|---|
| 7,603,551 B2 * | 10/2009 | McGrath et al. | 713/164 |
| 2003/0156332 A1 | 8/2003 | Seino et al. | |
| 2010/0162041 A1 * | 6/2010 | El-Shishiny et al. | 714/10 |
| 2011/0113122 A1 * | 5/2011 | Drope | 709/219 |
| 2011/0125960 A1 * | 5/2011 | Casselman | 711/104 |
| 2012/0079323 A1 * | 3/2012 | Chincisan | 714/18 |

FOREIGN PATENT DOCUMENTS

| | | |
|---|---|---|
| WO | WO2006095320 A2 | 9/2006 |
| WO | WO2008154792 A2 | 12/2008 |

OTHER PUBLICATIONS

Vtron Corp et al. "Touch panel device and multi-point touch locating method", CN101110008(A) English Abstract—Jan. 23, 2008, Espacenet—Bibliographic data, 2 pages.

* cited by examiner

HANDLING A FAILED PROCESSOR OF A MULTIPROCESSOR INFORMATION HANDLING SYSTEM

CROSS-REFERENCE TO RELATED APPLICATIONS

This application is based on and claims the benefit of priority from Taiwan Patent Application 99146950, filed on Dec. 30, 2010.

BACKGROUND OF THE INVENTION

1. Field of the Invention

The present invention relates to an information handling system, and more particularly relates to an apparatus and method for handling a failed processor of a multiprocessor information handling system.

2. Background of the Related Art

Along with continuous improvement and development in the components of an information handling system, techniques for handling and restoring normal operations of hardware failures have also greatly advanced. With those conventional techniques, some failures may be fixed whereas certain techniques are nevertheless undesirably affected.

For the current information handling system techniques with multiple processors, an information handling system remains inoperable in the event of a primary central processor failure despite the fact that other central processors may still provide normal functionality. That is to say, the above issue persists regardless of how many central processors are implemented under the trend of the expanding number of processors.

In view of the above, there is a need for a solution for effectively handling a central processor failure of an information handling system.

BRIEF SUMMARY OF THE INVENTION

An apparatus for handling a failed processor of a multiprocessor information handling system is provided by the present invention. The multiprocessor information handling system comprises at least two processors interconnected by processor interconnects for facilitating transactions of the processors. The at least two processors comprise a first processor and a second processor, with the first processor being set as a default boot processor. The apparatus comprises: a baseboard management module, for detecting and receiving health information of the at least two processors; a multiplexer, coupled to the baseboard management module and respectively to the at least two processors, being operable to switch between the at least two processors; and a processor identification (ID) controller, coupled to the baseboard management module and respectively to the at least two processors. In response to the health information indicating the first processor has failed, the processor ID controller sets the second processor as the default boot processor and the baseboard management module enables the multiplexer to switch to the second processor.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE INVENTION

Figure 1:
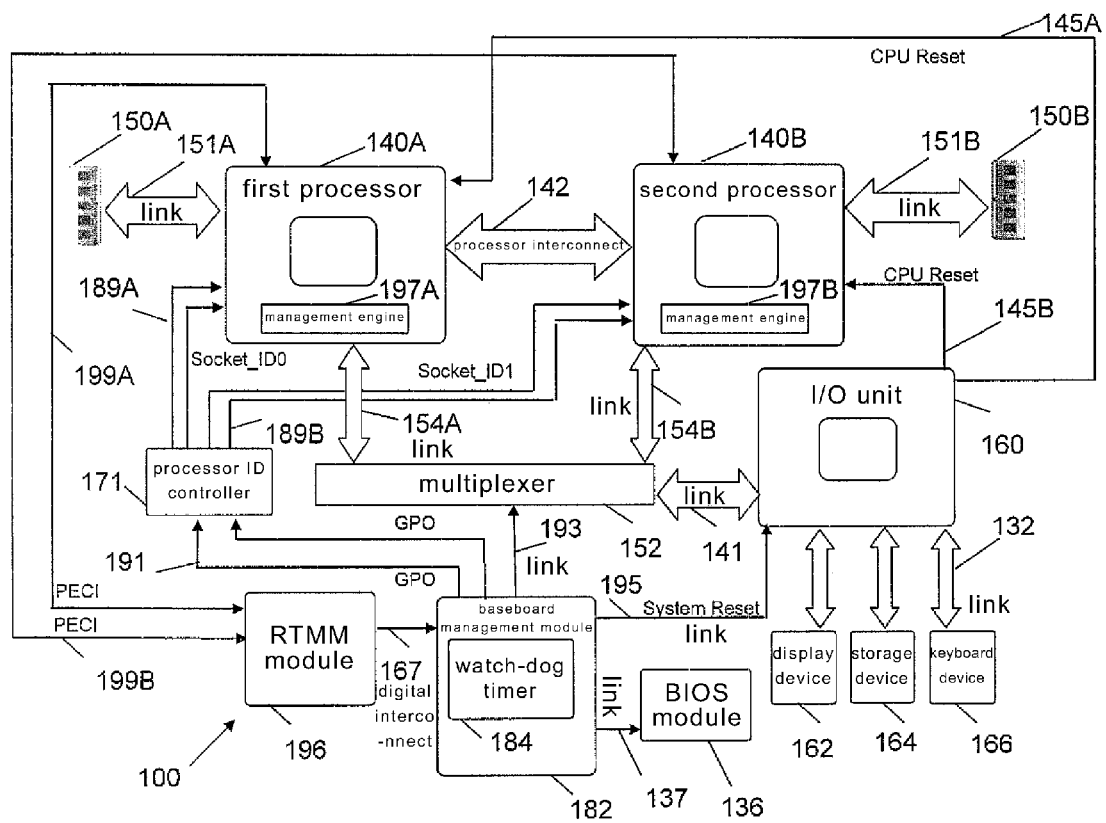
FIG. 1 is a schematic diagram illustrating a structure of a system according to an embodiment of the present invention.

The apparatus further comprises: an I/O device; and an I/O unit, coupled between the I/O device and the multiplexer, for facilitating the transactions, being further coupled to the baseboard management module and respectively to the at least two processors.

The apparatus further comprises: a real-time management module (RTMM), coupled to the baseboard management module and respectively to the at least two processors, for accessing the health information from the baseboard management module; and a basic input/output system (BIOS), for booting the at least two processors. The RTMM module is respectively coupled to the at least processors via a digital interconnect, which includes a platform environmental control interface (PECI) bus or a running average power limit (RAPL) bus.

The detection comprises: receiving by the baseboard management module a power-on-self-test (POST) complete command from the BIOS; and accessing by the baseboard management module the health information via the digital interconnect to confirm the first processor has failed.

In response to the second processor being set as the default boot processor, the baseboard management module triggers a system reset to the I/O unit, and the I/O unit sends a CPU reset to the first processor.

The apparatus further comprises: a first processor socket, for accommodating the first processor; and a second processor socket, for accommodating the second processor. The processor ID controller comprises a processor socket ID controller for switching between the first processor socket and the second processor socket.

The baseboard management module includes a baseboard management controller (BMC); the processor interconnect includes a QuickPath Interconnect (QPI) bus; the I/O unit includes an I/O hub; and the I/O device includes a display device, a storage device and/or a keyboard device.

A method for handling a failed processor of a multiprocessor information handling system is further provided by the present invention. The multiprocessor information handling system comprises at least two processors interconnected by processor interconnects for facilitating transactions of the processors. The at least two processors comprise a first processor and a second processor, with the first processor being set as a default boot processor. The method comprises: detecting and receiving, via a baseboard management module, health information of the at least two processors; providing a multiplexer operative to switch between the at least two processors, the multiplexer being coupled to the baseboard management module and respectively to the at least two processors; and, in response to the health information indicating the first processor has failed, setting, via a processor ID controller, the second processor as the default boot processor and enabling, via the baseboard management module, the multiplexer to switch to the second processor.

A multiprocessor information handling system is further provided by the present invention. The multiprocessor information handling system comprises: at least two processors including a first processor and a second processor, with the first processor being set as a default boot processor; a processor interconnect, for interconnecting the at least two processors; a baseboard management module, for detecting and receiving health information of the at least two processors; a multiplexer, coupled to the baseboard management module and respectively to the at least two processors, being operable to switch between the at least two processors; and a processor ID controller, coupled to the baseboard management module and respectively to the at least two processors. In response to the health information indicating the first processor has failed, the processor ID controller sets the second processor as the default boot processor and the baseboard management module enables the multiplexer to switch to the second processor.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
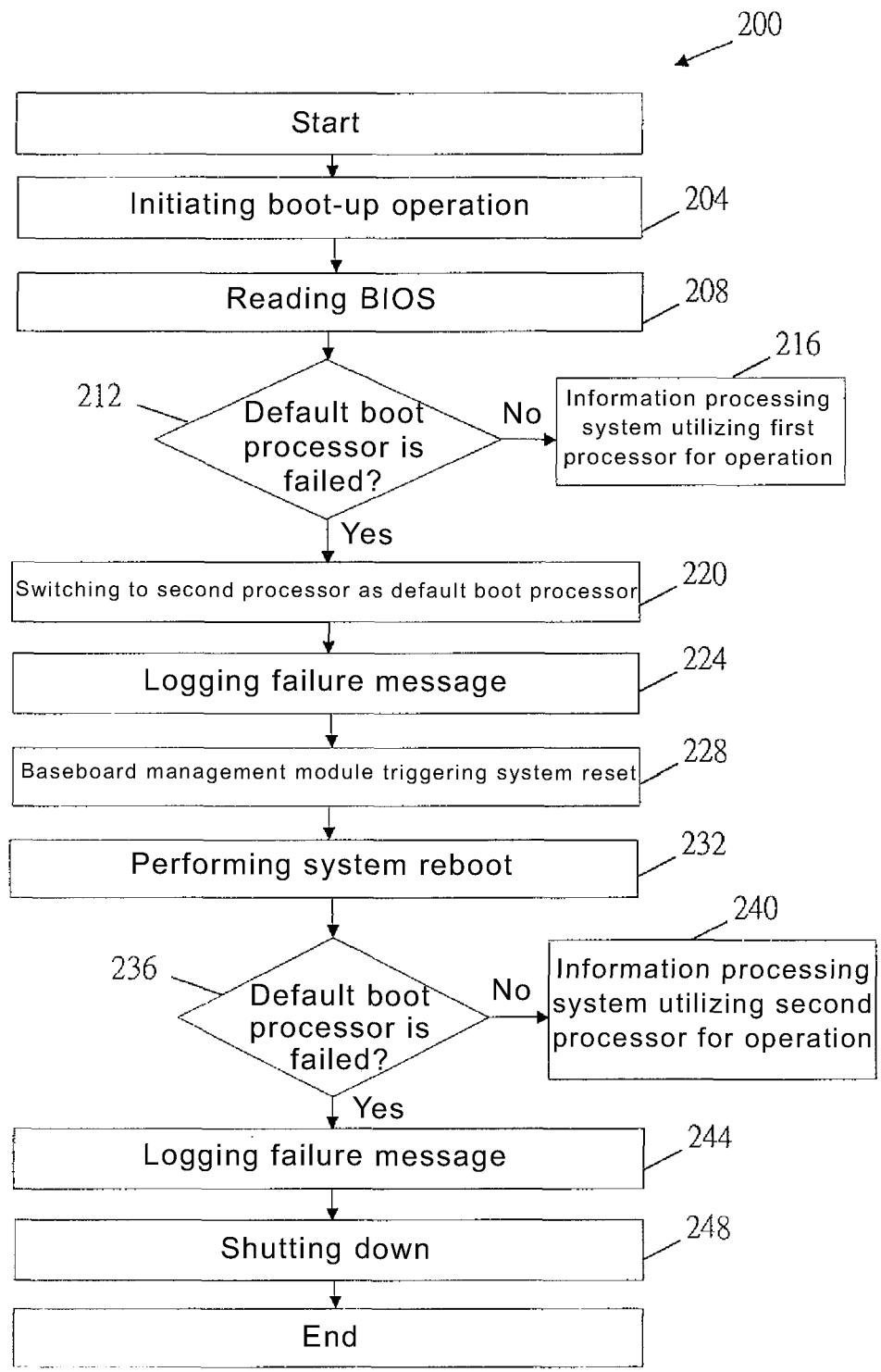
FIG. 2 is a flowchart of a method according to an embodiment of the present invention.
Figure 3:
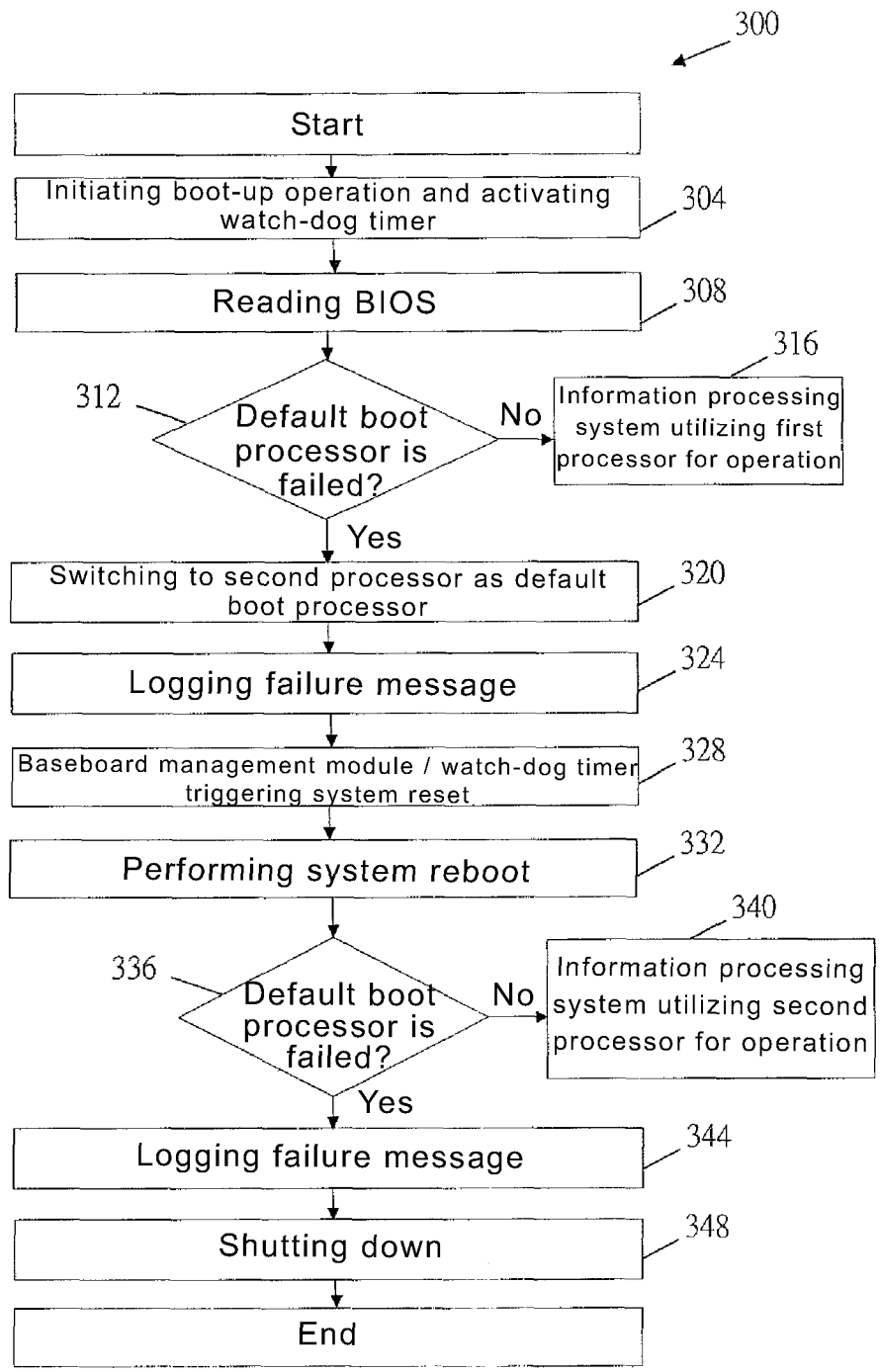
FIG. 3 is a flowchart of a method according to another embodiment of the present invention.

Referring now to FIG. 1 through FIG. 3, a system, devices, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram of an information handling system 100 according to an embodiment of the present invention. For example, the information handling system 100 is a multi-core computer comprising a plurality of central processors capable of concurrently executing tasks. Based on tasks executed by the information handling system 100, various other devices may be coupled to the processors. The information handling system 100 further comprises a motherboard (not shown) for providing electrical connections and installations among various components.

In a preferred embodiment of the present invention, a dual-core system is taken as an example for the information handling system 100. It is to be understood that the present information is not limited to the example but is applicable to other types of multi-core systems. As shown in FIG. 1, the information handling system 100 comprises two processors or central processors 140A and 140B. Each processor typically comprises processing components (not shown) and resources (not shown). The processing components typically include a core, a thread unit, a processing unit and/or other associated components. The resources typically include logics, firmware, memories, registers and/or other code-executing components. In general, the processing components are capable of maintaining a status of a processor, e.g., an execution status or a structure status; a portion of the resources may be entirely or partly dedicated to predetermined processing components and a remaining portion of the resources may be shared by predetermined processing components. Furthermore, the core, typically referring to a logic of an integrated circuit, is capable of maintaining an independent structure status each associated with some predetermined dedicated resources.

As mentioned above, the information handling system 100 comprises the first processor 140A and the second processor 140B. Memories 150A and 150B are respectively coupled to the two processors 140A and 140B via links 151A and 151B. For example, the memories 150A and 150B are memory devices of any types including random access memory (RAM), cache memory, flash memory and other memory devices. For example, the links 151A and 151B are a RAM link such as a double data rate 3 (DDR3) link, but the present invention is not limited thereto.

Referring to FIG. 1, the two processors 140A and 140B are coupled to a multiplexer 152, which is coupled to an I/O unit 160. For example, the I/O unit 160 is an I/O hub (but the present invention is not limited thereto), functions of which are known in the art and shall not be further described. For example, the I/O unit 160 (such as an I/O hub) is coupled to different I/O devices (e.g., a display device 162, a storage device 164 and a keyboard device 166) via links 132. In another preferred embodiment, the I/O unit 160 is a super I/O for controlling communications between the I/O devices and the processors 140A and 140B.

In a preferred embodiment, the two processors 140A and 140B may be respectively realized by x86 microprocessors. In other embodiments of the present invention, the processors 140A and 140B may respectively be any types of processors, e.g., processors of the same or different manufacturers or forms.

It should be noted that the processors 140A and 140B are heterogeneous processors. In a preferred embodiment, the processors 140A and 140B may not only be physically independent processors but also have different operating characteristics. In another preferred embodiment, the processors 140A and 140B may be heterogeneous processor cores implemented in a multi-core processing unit.

An operating system is executed on the processors 140A and 140B to coordinate and provide the various components in the information handling system 100 shown in FIG. 1. The operating system may be a commercially available operating system. An object from a program system may be integrated with the operating system and provide calls for the operating system from java scripts or application systems executed in the information handling system. Commands, object-oriented program systems, application programs and codes of the operating system are stored in the storage device 164 (e.g., a hard disk drive), and are loaded to the primary memories 150A and 150B for further processing by the processors 140A and 140B. It will be apparent to a person skilled in the art, having the benefit of the present disclosure, that various modifications may be made to the hardware of FIG. 1 according to the embodiments of the present invention. Other internal hardware or peripheral devices, e.g., flash memories, CD-ROMs and other similar devices, may be incorporated into or disposed in the hardware of FIG. 1.

The processors 140A and 140B may be coupled by a processor interconnect 142. In a preferred embodiment, the processor interconnect 142 may include a point-to-point link, e.g., a QuickPath Interconnect (QPI) bus or a HyperTransport (HT) bus, and may also be implemented by other types of interconnects in other embodiments.

In a preferred embodiment, the I/O unit 160, which may be any type of I/O hub, comprises a bridge and a graphic circuit (not shown) to serve as an interface between processors (e.g., the processors 140A and 140B) and various types of I/O devices (e.g., the display device 162, the storage device 164 and the keyboard device 166). For example, the I/O unit 160 is coupled to the multiplexer 152 via a link 141, which may be a Direct Media Interface (DMI) bus or a HT bus providing a high-speed, bidirectional and point-to-point connection. For example, the multiplexer 152 may be a DMI multiplexer, but the present invention is not limited thereto. The multiplexer 152 may be respectively coupled to the processors 140A and 140B via links 154A and 154B, which may be a DMI bus or a HT bus providing a high-speed, bidirectional and point-to-point connection.

The structure depicted in FIG. 1 further comprises a baseboard management module 182 coupled to a processor identification (ID) controller 171, the multiplexer 152 and the I/O unit 160. Preferably, the baseboard management module 182 is a baseboard management controller (BMC) in the information handling system 100. Alternatively, the baseboard management module 182 may also be realized by an independent baseboard management module. For example, the baseboard management module 182 may be a Renesas 2117A BMC or an Aspeed AST2050 BMC. Furthermore, the baseboard management module 182, e.g., a BMC, is typically a microcontroller for monitoring operations of the information handling system. In an embodiment, the BMC 182 monitors operation states in the information handling system, including but not limited to usage states of processors and memory components in the information handling system, voltages across or applied to components in the information handling system, and temperatures of components in the information handling system. To achieve the above monitoring functionality, the BMC 182 is coupled to the components via various device buses.

In a preferred embodiment, the processor ID controller 171 is coupled between the baseboard management module 182 (e.g., a BMC) and the processor 140A as well as between the baseboard management module 182 and the processor 140B, so as to selectively switch among a plurality of processors and setting the selected boot processor. For example, the processor ID controller 171 is a processor socket ID controller (but the present invention is not limited thereto). In a preferred embodiment, the processors are connected to a motherboard of the information handling system 100 via a processor socket to provide mechanical and electrical connections. Correspondingly, the processors respectively comprise a multifunctional strap pin with a socket ID for selectively setting a predetermined processor as a boot processor. In an information handling system comprising four processors, ID0 is conventionally a boot processor, whereas ID1 to ID3 are functional processors. In an information handling system comprising two processors, ID0 is conventionally a boot processor, whereas ID1 is a functional processor. In other words, the processor ID controller 171 (e.g., a processor socket ID controller) is electrically connected to the first processor 140A and the second processor 140B for switching and selecting between the first processor 140A and the second processor 140B, so as to execute boot-up procedures or post boot-up procedures of the information handling system 100. Details of the switching and selection shall be given shortly.

In an embodiment, the BMC 182 may be coupled to the processor ID controller 171 via a general purpose output (GPO) transmission interface 191, which may be a GPO pin of a general purpose input/output (GPIO) interface of the BMC 182. It should be noted that, the GPIO interface is a parallel interface with great flexibility allowing all sorts of customized coupling approaches.

In an embodiment, the BMC 182 may be coupled to the multiplexer 152 via a link 193, e.g., a GPIO transmission interface or an Inter-Integrated Circuit (I2C) transmission interface, coupled to the I/O unit 160 via a link 195, e.g., a Low Pin Count (LPC) bus and GPO transmission interface, and coupled to a basic input/output system (BIOS) module 136 via a link 137, e.g., a Low Pin Count (LPC) bus or a Serial Peripheral Interface (SPI) bus. The processor ID controller 171 may be respectively coupled to the first processor 140A (with a multifunctional strap pin Socket_ID0) and the second processor 140B (with a multifunctional strap pin Socket_ID1) via a link 189A and a link 189B through general output decoding. In an embodiment, through general output decoding, the processor ID controller 171 receives signals from the BMC 182 via the GPO transmission interface 191 to respectively set the multifunctional strap pins Socket_ID0 and Socket_ID1 to the first processor 140A and the second processor 140B.

Firmware of the BMC 182 performs system monitoring in compliance to the Intelligent Platform Management Interface (IPMI) specifications. The IPMI specifications, such as IPMI 2.0, are common knowledge for associated manufacturers and shall not be further described.

The structure depicted in FIG. 1 further comprises a real-time control and management (RTMM) module 196. In a preferred embodiment, for example, the RTMM module 196 is a function logic IC corresponding to the BMC 182 (but the present invention is not limited thereto), so as to provide a single management interface for performing real-time management, monitoring and control on the information handling system.

In an embodiment, the RTMM module 196 may be disposed in the system, and is respectively coupled to the processor 140A and the processor 140B via digital interconnects 199A and 199B. For example, the digital interconnects 199A and 199B are a platform environmental control interface (PECI) bus or a running average power limit (RAPL) bus, but the present invention is not limited thereto. For example, the PECI buses 199A and 199B allow respective management engines 197A and 197B of the processor 140A and the processor 140B to access information from the processor 140A and the processor 140B. Typically the PECI buses 199A and 199B are implemented for transmission of platform environment information, processor health information and thermal management information. However, the processor 140A and the processor 140B may still utilize the PECI buses 199A and 199B to transmit information to other components. Furthermore, in an embodiment, the RTMM module 196 may also acquire a status of a processor through a built-in self-test (BIST) of a memory of the processor. The RTMM module 196 is also coupled to the BMC 182 via a digital interconnect 167.

The management engines 197A and 197B primarily manage health conditions in the processors, internal register information, and dynamic energy consumption calculation and storage. In a preferred embodiment, the above mechanism is implemented in the processor 140A and 140B to perform information transmission by coupling the PECI buses 199A and 199B to the RTMM module 196. The PECI or the RAPL is one of the reliable means for obtaining health information of a plurality of processors. For example, when any of the processors fails and/or the DMI bus 141 (or the HT bus) malfunctions, the independent and separate PECI or RAPL is indeed a reliable interface.

The BIOS module 136 may be coupled to the baseboard management module 182. For example, the BIOS module 136 is firmware embedded in a non-volatile memory chip and includes a BIOS. In a preferred embodiment, the BIOS module 136 is used for, but not limited to, driving the first processor 140A and/or the second processor 140B to execute the boot-up operation of the information handling system 100.

When booting the information handling system 100, a processor first fetches a code from the BIOS module 136 of the motherboard. The code in the BIOS module 136 handles initialization operations of the information handling system, including a power-on-self-test (POST), initializations and tests. During the boot-up operation of the information handling system 100, control is handed over to the BIOS. The BIOS first checks whether registers and flags of the processors and then a timer and a DMA controller are functioning well. The BIOS further initializes chipsets, memories and registers of other peripheral devices.

The BIOS module 136 may be coupled to the baseboard management module 182 via a link 137, which is a LPC bus, for example, but the present invention is not limited thereto. In another embodiment, the BIOS module 136 may be coupled to the baseboard management module 182 via a conventional industry standard architecture (ISA) bus.

Substantially, the BIOS module 136 primarily executes elementary functions. For example, the BIOS module 136 performs a self test during the boot-up operation of the information handling system 100 and the boot-up operation of the BIOS. The POST routine tests sub-systems in the information handling system 100, quarantines failures and reports issues back to a user. The BIOS of the BIOS module 136 is capable of simultaneously handling elementary input/output operations of the various peripheral devices, including the display device 162, the storage device 164 and the keyboard device 166. Furthermore, the BIOS is also responsible for loading the operating system to a system memory of the information handling system 100.

The BIOS module 136 further comprises a memory buffer (not shown). During the POST process, the BIOS module 136 executes an operating command to configure the memory buffer. In an embodiment, the memory buffer may be configured with fields for recording all types of data, e.g., an identifier of a bus, an identifier of a device and functions.

In an embodiment, the I/O unit (e.g., an I/O hub) 160 may be respectively coupled to the first processor 140A and the second processor 140B via links 145A and 145B; and the baseboard management module (e.g., a BMC) 182 may be coupled to the I/O hub 160 via a link 195. The BMC 182 may send a system reset to the I/O hub 160, which then sends a CPU reset to the first processor 140A and the second processor 140B. In other words, the BMC 182 triggers the system reset and transmits the system reset to, e.g., the I/O hub 160, to perform subsequent system reset operations. Operations before and after the reset will be described in detail below.

The information handling system 100 may be implemented by any appropriate computers; a common personal computer or server, e.g., IBM® BladeCenter® or System X® servers ("IBM", "BladeCenter", and "System X" are the registered trademarks of International Business Machines Corporation of Armonk, N.Y.), may be referred to for associated fundamental structures and components of the information handling system 100. It should be noted that although a computer is taken as an example in the embodiments of the present invention, other types of information handling systems, such as an Internet computer, a server or a work station, may also be utilized in other embodiments of the present invention.

Referring to FIG. 2 showing a flowchart of a method 200 for handling a failed central processor according to the present invention, descriptions will be made in conjunction with FIG. 1. It should be noted that the information handling system 100 merely is taken as an example for illustrating the method for handling a failed central processor according to an embodiment of the present invention, but not for limiting the present invention thereto.

In Step 204, a boot-up operation is initiated.

In Step 208, a BIOS is read. In an embodiment, after receiving a power signal, the first processor 140A is set as a default boot processor for executing a boot-up operation. The first processor 140A reads firmware of the BIOS from the BIOS module 136 at this point.

In Step 212, it is detected whether the default boot processor (e.g., the first processor 140A having a processor socket ID of ID0) has failed. In an embodiment, the baseboard management module 182 (e.g., a BMC) detects whether the first processor 140A has failed. A preferred detection approach is that, the BMC 182 first receives a POST complete command from the BIOS module 136 (e.g., the BIOS module 136 notifies the BMC 182 of information associated with a completed POST via an IPMI command), and the BMC 182 then confirms the first processor 140A has failed via the PECI bus 199A.

In Step 216, the information handling system 100 utilizes the first processor 140A for operations when the default boot processor (the first processor 140A) is not failed.

In Step 220, when the default boot processor (the first processor 140A) has failed, another processor (e.g., the second processor 140B) is set as the default boot processor. In an embodiment, the baseboard management module 182 (e.g., a BMC) controls the processor ID controller 171 (e.g., a processor socket ID controller) to set the second processor 140B having a processor socket ID of ID1 as the boot processor, and the BMC 182 then controls the multiplexer 152 (e.g., a DMI multiplexer) to switch the default boot processor to the second processor 140B. For example, the processor ID controller 171 is a processor socket ID controller and may be implemented through general output decoding. The baseboard management module 182 then resets the processor interconnect 142 (e.g., a QPI interconnect) between the processors to disconnect the failed first processor 140A from a ring topology of a CPU group.

In Step 224, the baseboard management module 182 logs a failure message. In an embodiment, the baseboard management module 182 logs a failure message of the first processor 140A to an internal event log segment (not shown). Details of the log may include the failure message of the boot processor, such as a core failure, a cache failure, a memory controller failure or a DMI bus failure. In an embodiment, the internal event log segment may be implemented to a flash memory component (not shown) of the baseboard management module 182. The flash memory component is typically partitioned into a plurality of segments, e.g., system private segments, user data segments, and internal event log segments.

In Step 228, a system reset is triggered. In an embodiment, the baseboard management module 182 triggers the system reset and transmits the system reset to the I/O unit 160 (e.g., an I/O hub) to perform subsequent system reset operations. For example, the baseboard management module 182 sends the system reset to the I/O unit 160, which then sends a CPU reset to the first processor 140A.

In Step 232, a system reboot is performed.

In Step 236, it is detected whether the default boot processor (the second processor 140B) has failed. In an embodiment, the baseboard management module 182 (e.g., a BMC) detects whether the second processor 140B has failed. A preferred detection approach is that, if the BMC 182 doesn't receive a POST complete command from the I/O unit 160 (e.g., I/O unit 160 fetches and executes BIOS code from the BIOS module 136 and notifies the BMC 182 of information associated with a completed POST via GPIO handshaking or any other command like LPC, or IPMI OEM command), the BMC 182 then confirms the second processor 140B has failed via the PECI bus 199B In Step 240, the information handling system 100 utilizes the second processor 140B for operations when the default boot processor (e.g., the second processor 140B) is not failed.

In Step 244, when the default boot processor (e.g., the second processor 140B) has failed, the baseboard management module 182 logs a failure message. In an embodiment, the baseboard management module 182 logs failure messages of the first processor 140A and the second processor 140B to an internal message storage region, and the logged details may include a position of the failed boot processor and possible reasons for the failure.

In Step 248, the baseboard management module 182 shuts down the information handling system 100.

Referring to FIG. 3 showing a flowchart 300 of a method for handling a failed central processor according to the present invention, descriptions will be made in conjunction with FIG. 1. It should be noted that the information handling system 100 merely is taken as an example for illustrating the method for handling a failed central processor according to an embodiment of the present invention but not for limiting the present invention thereto.

In Step 304, according to an embodiment of the present invention, a boot-up operation is initiated, and a watch-dog timer 184 is activated. In an embodiment, the watch-dog timer 184 is realized by a conventional watch-dog timer component that detects various malfunctions when executing software codes in the I/O unit 160 or the baseboard management module 182. For example, the conventional watch-dog timer detects sequence malfunctions and timing malfunctions.

In Step 308, the BIOS is read. In an embodiment, the first processor 140A set as the default boot processor receives a power signal to start the boot-up operation. At this point, the first processor 140A reads firmware of the BIOS from the BIOS module 136.

In Step 312, it is detected whether the default boot processor (e.g., the first processor 140A having a processor socket ID of ID0) has failed. In an embodiment, the baseboard management module 182 (e.g., a BMC) detects whether the first processor 140A has failed. A preferred detection approach is that, if the baseboard management module 182 doesn't receive a POST complete command from the I/O unit 160 before the watch-dog timer times out (e.g., I/O unit 160 fetches and executes BIOS code from the BIOS module 136 and notifies the BMC 182 of information associated with a completed POST via GPIO handshaking or any other command like LPC, or IPMI OEM command), the baseboard management module 182 then confirms the first processor 140A has failed via the PECI bus 199A.

In Step 316, the information handling system 100 utilizes the first processor 140A for operations when the default boot processor (the first processor 140A) is not failed.

In Step 320, when the default boot processor (the first processor 140A) has failed, another processor (e.g., the second processor 140B) is set as the default boot processor. In an embodiment, the baseboard management module 182 controls the processor ID controller 171 to set the second processor 140B having a processor socket ID of ID1 as the boot processor, and the baseboard management module 182 then controls the multiplexer 152 (e.g., a DMI multiplexer) to switch the default boot processor to the second processor 140B. For example, the processor ID controller 171 is a processor socket ID controller of FIG. 1 and FIG. 2. The baseboard management module 182 then resets the processor interconnect 142 (e.g., a QPI interconnect) between the processors to disconnect the failed second processor 140B from a ring topology of a CPU group.

In Step 324, the baseboard management module 182 logs a failure message. In an embodiment, the baseboard management module 182 logs a failure message of the first processor 140A, and details of the log may include those described in association with Step 224 of FIG. 2.

In Step 328, the baseboard management module 182/the watch-dog timer 184 trigger a system reset and re-arm the watch-dog timer. In an embodiment, when the baseboard management module 182 (e.g., a BMC) does not receive a POST complete command within a predetermined period (e.g., 20 seconds), this is interpreted to mean that Steps 308 to 324 are not completed. A cause may be that other failures resulting in poor communication possibly exist among the first processor 140A and other components. In an embodiment, when the baseboard management module 182 obtains timeout information of the watch-dog timer 184, the baseboard management module 182 regards the first processor 140A as failed and again reads the PECI information. Supposing the baseboard management module 182 is still unable to obtain any information, the baseboard management module 182 performs subsequent steps (e.g., switching the default boot processor to the second processor, logging the failure message, performing the system reboot, and so on). In an embodiment, the watch-dog timer 184 of the baseboard management module 182 triggers a system reset and sends the system reset to the I/O unit 160 (e.g., an I/O hub), which then sends a CPU reset to the first processor 140A and/or the second processor 140B to perform subsequent system reset operations. In other words, the watch-dog timer 184 in this embodiment provides enhanced failure processing that forcibly performs resetting, failure detection and system reset.

In Step 332, system reboot is performed.

In Step 336, it is detected whether the default boot processor (e.g., the second processor 140B) has failed. In an embodiment, the BMC 182 detects whether the second processor 140B has failed. A preferred detection approach is that, if the baseboard management module 182 doesn't receive a POST complete command from the I/O unit 160 before the watch-dog timer times out (e.g., I/O unit 160 fetches and executes BIOS code from the BIOS module 136 and notifies the BMC 182 of information associated with a completed POST via GPIO handshaking or any other command like LPC, or IPMI OEM command), the baseboard management module 182 then confirms the second processor 140B has failed via the PECI bus 199B.

In Step 340, the information handling system 100 utilizes the second processor 140B for operations when the default boot processor (e.g., the second processor 140B) is not failed.

In Step 344, when the default boot processor (e.g., the second processor 140B) has failed, the baseboard management module 182 logs a failure message. In an embodiment, the baseboard management module 182 logs failure messages of the first processor 140A and the second processor 140B, and details of the log may be as those described in association with the Step 244 of FIG. 2.

In Step 348, the baseboard management module 182 shuts down the information handling system 100.

In the foregoing embodiments, two processors and two corresponding processor sockets (e.g., ID0 and ID1) are used as examples. However, in another embodiment, more than two processors and corresponding processor sockets, e.g., four processors and four corresponding processor sockets (e.g., ID0, ID1, ID2 and ID3), may be adopted, as the present invention is not limited to applications of a predetermined number of processors. The processors are interconnected by processor interconnects (e.g., a QPI interconnect). A multiplexer is coupled to an I/O unit and respectively to the processors, and other components are arranged in a configuration similar to that of FIG. 1. Similarly, through operations of a processor ID controller, a baseboard management module and other associated components, two or more processors (e.g., four processors) may be sequentially set as a boot processor.

According to an embodiment of the present invention, in the event of a failed default boot processor in a multiprocessor information handling system, the information handling system still functions normally (e.g., by utilizing a next processor) to provide a user with partial calculation capabilities, so as to eliminate a situation of complete boot failure. Meanwhile, the present invention is applicable to any multiprocessor information handling system regardless of the number of processors in the multiprocessor information handling system. The present invention provides even more outstanding advantages and effects under the prevailing trend of field replace units (FRU). For example, when components of the processors are realized by FRUs, in an embodiment of the present invention, even if a default boot processor of a multiprocessor information handling system has failed, the information handling system remains operable before FRU processors are replaced by service staff arriving on-site since the information handling system uninterruptedly provides partial calculation capabilities, thereby reducing undesirable effects on both human and material resources for users (e.g., customers).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art, after having read the foregoing disclosure, without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus for handling a failed processor of a multiprocessor information handling system, the multiprocessor information handling system comprising at least two processors interconnected by processor interconnects for facilitating transactions of the processors, the at least two processors comprising a first processor and a second processor, the first processor being set as a default boot processor in response to a boot-up operation of the multiprocessor information handling system, the apparatus comprising:

a baseboard management module for detecting and receiving health information of the at least two processors;
a multiplexer coupled to the baseboard management controller and respectively to the at least two processors, wherein the multiplexer is operative to switch between the at least two processors;
a first processor socket for accommodating the first processor and a second processor socket for accommodating the second processor; and
a processor ID controller coupled to the baseboard management controller and respectively to the at least two processors, wherein the processor ID controller comprises a processor socket ID controller for setting either the first processor received in the first processor socket as the default boot processor or the second processor received in the second processor socket as the default boot processor;
wherein, in response to the health information indicating the first processor has failed, the processor ID controller sets the second processor as the default boot processor and the baseboard management controller enables the multiplexer to switch to the second processor.

2. The apparatus of claim 1, further comprising:
an I/O device; and
an I/O unit coupled between the I/O device and the multiplexer for facilitating the transactions, and wherein the I/O unit is further coupled to the baseboard management controller and respectively to the at least two processors.

3. The apparatus of claim 2, further comprising:
a real-time control and management (RTMM) module coupled to the baseboard management controller and respectively to the at least two processors, for enabling the baseboard management controller to access the health information; and
a basic input/output system (BIOS) for booting the at least two processors.

4. The apparatus of claim 3, wherein the RTMM module is respectively coupled to the at least two processors via a digital interconnect selected from a platform environmental control interface (PECI) bus and a running average power limit (RAPL) bus.

5. The apparatus of claim 3, wherein the detection comprises:
the baseboard management controller receiving a power-on-self-test (POST) complete command from the BIOS; and
the baseboard management controller accessing the health information via the digital interconnect to confirm the first processor has failed.

6. The apparatus of claim 3, wherein, in response to the second processor being set as the default boot processor, the baseboard management controller triggers a system reset to the I/O unit, and the I/O unit sends a CPU reset to the first processor.

7. The apparatus of claim 2, wherein the processor interconnect includes a QuickPath Interconnect (QPI) bus, the I/O unit includes an I/O hub, and the I/O device is selected from a display device, a storage device, a keyboard device, and combinations thereof.

8. A multiprocessor information handling system, comprising:
at least two processors comprising a first processor and a second processor, the first processor being set as a default boot processor;
a processor interconnect for interconnecting the at least two processors;

a baseboard management controller for detecting and receiving health information of the at least two processors;

a multiplexer coupled to the baseboard management controller and respectively to the at least two processors, wherein the multiplexer is operative to switch between the at least two processors;

a first processor socket for accommodating the first processor and a second processor socket for accommodating the second processor; and a processor ID controller coupled to the baseboard management controller and respectively to the at least two processors, wherein the processor ID controller comprises a processor socket ID controller for setting either the first processor received in the first processor socket as the default boot processor or the second processor received in the second processor socket as the default boot processor;

wherein, in response to the health information indicating the first processor has failed, the processor ID controller sets the second processor as the default boot processor and the baseboard management module causes the multiplexer to switch to the second processor.

9. The system of claim 8, further comprising:
an I/O device;
an I/O unit coupled between the I/O device and the multiplexer, for facilitating the transactions, wherein the I/O unit is coupled to the baseboard management controller and respectively to the at least two processors;
a RTMM module coupled to the baseboard management controller and respectively to the at least two processors, wherein the RTMM module enables the baseboard management controller to access the health information; and
a BIOS for booting the at least two processors.

10. The system of claim 9, wherein the detection comprises:
the baseboard management controller receiving a POST complete command from the BIOS; and
the baseboard management controller accessing the health information via the digital interconnect to confirm the first processor has failed.

11. The system of claim 9, wherein, in response to the second processor being set as the default boot processor, the baseboard management controller triggers a system reset to the I/O unit, and the I/O unit sends a CPU reset to the first processor.

* * * * *